United States Patent [19]

Ellis et al.

[11] Patent Number: 4,724,477
[45] Date of Patent: Feb. 9, 1988

[54] IMAGE ENHANCEMENT WITH COLOR CORRECTOR IN PARALLEL WITH FRINGE SIGNAL GENERATORS

[75] Inventors: Simon C. Ellis, Herts.; Robert J. Oldershaw, Norfolk; Ignazio Barraco, Peterborough, all of England

[73] Assignee: Crosfield Electronics (USA) Limited, London, England

[21] Appl. No.: 762,758

[22] Filed: Aug. 6, 1985

[30] Foreign Application Priority Data

Aug. 17, 1984 [GB] United Kingdom .................. 8420927
Dec. 4, 1984 [GB] United Kingdom .................. 8430512

[51] Int. Cl.$^4$ ............................................. H04N 1/46
[52] U.S. Cl. ......................................... 358/80; 358/79; 358/751
[58] Field of Search ....................... 358/78, 75, 79, 80, 358/280, 284, 299

[56] References Cited

U.S. PATENT DOCUMENTS 2,691,696 10/1954 Yule ..................................... 358/280
2,939,908 6/1960 Shapiro ............................... 358/79
4,096,519 6/1978 Hoffrichter et al. ............. 358/79 X
4,484,232 11/1984 Gast ..................................... 358/284

FOREIGN PATENT DOCUMENTS 76380 4/1983 European Pat. Off. .
3014262 10/1981 Fed. Rep. of Germany ........ 358/79
2455307 4/1980 France .
2050106 12/1980 United Kingdom .
2053619 2/1981 United Kingdom .

Primary Examiner—James J. Groody
Assistant Examiner—Robert M. Bauer
Attorney, Agent, or Firm—Sughrue, Mion, Zinn, Macpeak and Seas

[57] ABSTRACT

Apparatus for enhancing an image represented by picture signals corresponding to respective color components of successive elements of the image comprises signal generators for generating sharp and unsharp signals from the picture signals. Fringe signal generators derive a plurality of fringe signals by combining the sharp and unsharp signals in a predetermined manner; a correction circuit applies connected in parallel with the fringe signal generators modifying functions to the sharp or unsharp signals or other premodified picture signals to derive modified picture signals; and an adding circuit sums the fringe signals with the modified picture signals to derive a plurality of output signals.

13 Claims, 6 Drawing Figures

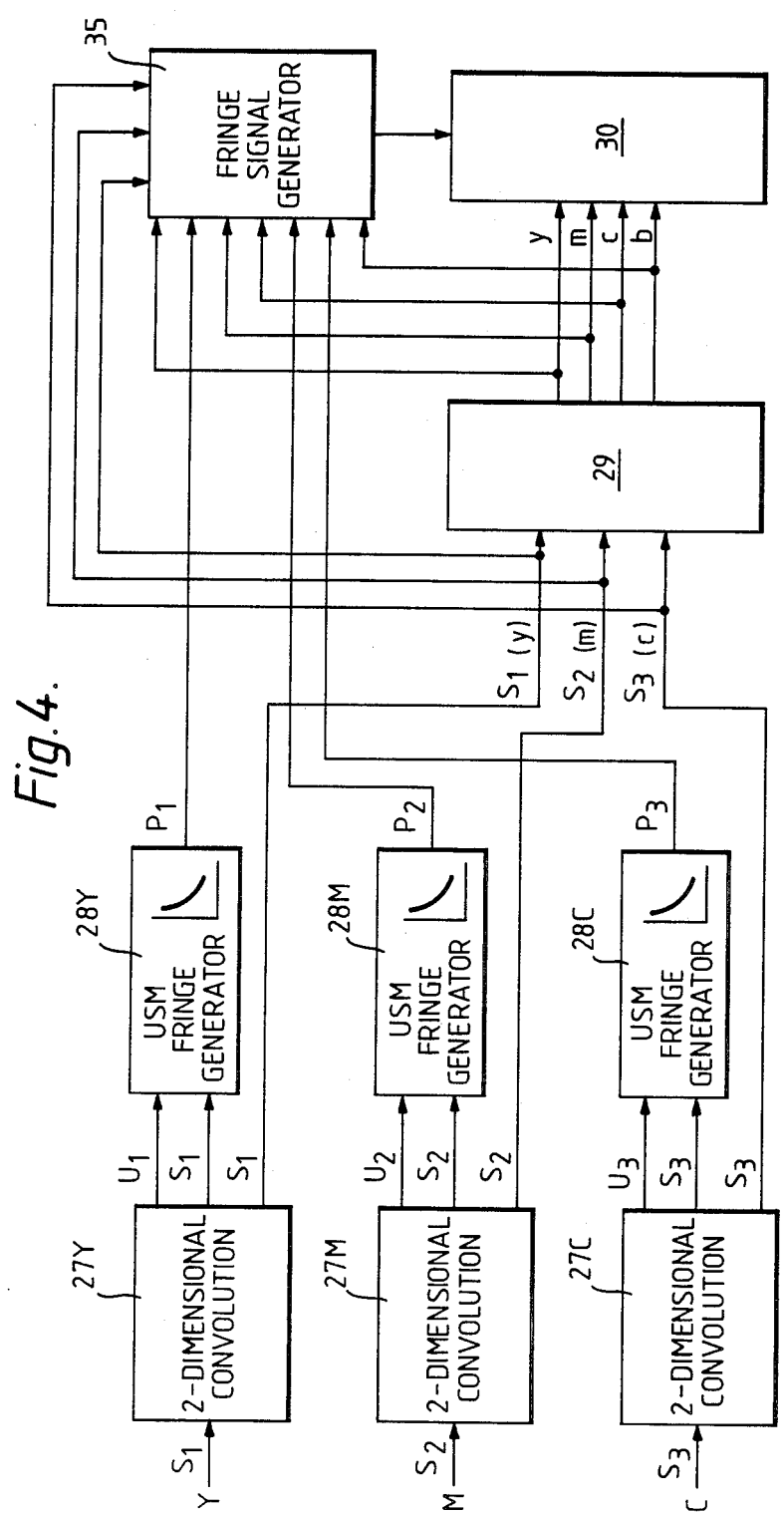

IMAGE ENHANCEMENT WITH COLOR CORRECTOR IN PARALLEL WITH FRINGE SIGNAL GENERATORS

BACKGROUND OF THE INVENTION

The invention relates to methods and apparatus for enhancing an image represented by picture signals corresponding to respective colour components of successive elements of the image.

In conventional electronic scanning apparatus an original image is scanned element by element by means of an electro-optical system to derive one or more signals representing the densities or transmittances of each colour component of successively scanned elements of the original image. For example, the picture signals could correspond to the densities of cyan, magenta, and yellow in each element of the original image.

Conventionally, before these electronic signals are used to control the exposure of an output medium they are modified by an operator to vary one or more characteristics of the output image. For example, the signals may be modified to adjust the tone of the output image, a black printer signal may be derived requiring the consequent removal of "under colour" from the colour-component signals, the ink grey balance may be adjusted as may the printing characteristic, etc.

A further enhancement which is often carried out is known as "unsharp masking". The purpose of unsharp masking is to increase the sharpness of boundaries in the image and may introduce a narrow fringe. In electronic image reproduction unsharp masking is achieved by deriving from the picture signals sharp and unsharp signals equivalent to viewing a small area and a large area incorporating the small area of the image respectively. These signals are then combined in a predetermined manner so that the contrast on either side of a boundary is increased. Thus, at a boundary between light and dark areas, the light area adjacent the boundary is made lighter and the dark area adjacent the boundary is made darker. This gives the visual effect of increased sharpness.

In the past, unsharp masking has been carried out on the incoming picture signals and the thus modified picture signals are then further modified to deal with tone correction, black printer signal generation and the like. This can cause problems because each of the these enhancements is non-linear and applying successive non-linear enhancements to the picture signals will seriously increase their frequency bandwidth and can introduce undesirable quantities of noise. Commonly, the picture signals comprise digital data and the noise is the inaccuracy that is brought into the digital data by the fact that the enhancement curves have to be approximated to digital values.

An example of a known system is described in GB-A No. 2050106 in which the same fringe signal is added to each of the modified picture signals.

SUMMARY OF THE INVENTION

In accordance with one aspect of the present invention, a method of enhancing an image represented by picture signals corresponding to respective colour components of successive elements of the image comprises deriving sharp and an unsharp signals from the picture signals; deriving a plurality of fringe signals by combining the sharp and unsharp signals in a predetermined manner; applying, in parallel with the deriving of the fringe signals, modifying functions to the sharp or unsharp signals or other premodified picture signals to derive modified picture signals; and summing the fringe signals with the modified picture signals to derive a plurality of output signals.

With this invention, a more controlled enhancement is achieved by using a plurality of fringe signals. Further, this method enables a fringe derived from any colour to be used with any colour channel. It also enables true enhancement to occur when a fringe is generated from its own source and so this also makes the image much sharper in the correct areas. It should be noted that the number of fringe signals does not need to be the same as the number of modified picture signals.

The two non-linear enhancements are carried out in parallel on the picture signals rather than in series and thus the effect of applying two non-linear corrections in series is avoided and the quantity of noise is considerably reduced while the bandwidth of the output signals is also reduced.

Preferably, the modified picure signals are derived by applying modifying functions to the sharp or unsharp signals so that the modifying functions referred to above include functions for deriving a sharp or unsharp signal.

The predetermined manner in which the sharp and unsharp signals are combined may be any conventional unsharp masking method as for example disclosed in our British Patent Specifications Nos. 1,244,748 or 2,032,219. In general each fringe signal may be derived by combining respective pairs of sharp and unsharp signals corresponding to the same colour component but in some cases the same sharp signal may be combined with each of the unsharp signals. In this latter case it is not necessary for a sharp signal and an unsharp signal to be generated from each picture signal.

The output signals may be further modified if required and then either stored or fed directly to a conventional exposing head where they control the exposure of a record medium in a conventional manner. As will be appreciated, this method is particularly applicable to electronic imaging systems and TV systems.

Although a black printer signal could be generated in a conventional manner, it is particularly preferable if the method further comprises deriving a black signal from the picture signals; deriving a black fringe signal; and summing the black fringe signal with the black signal to derive a black printer signal.

Preferably, the black fringe signal is only summed with the black signal if the black signal has a value above a predetermined threshold. For example, this threshold may be a print density corresponding to a 15% dot size in which case the "value" referred to is a print density.

In one arrangement, the method further comprises comparing the fringe signals to determine the fringe signal with the smallest value, the determined fringe signal being used additionally to constitute the black fringe signal.

In another arrangement, the method further comprises comparing the modified picture signals corresponding to each fringe signal to determine the modified picture signal with the smallest value, the fringe signal corresponding to the modified picture signal having the smallest value being used additionally to constitute the black fringe signal.

In all these methods it is preferable if the modified picture signal whose fringe signal corresponds to the black fringe signal is compared with the black signal, the black fringe signal being modified in accordance with the results of the comparison. This is useful since in some cases the bladk signal might be very much greater or less than the modified picture signal corresponding to the black fringe signal and thus the selected fringe signal will need to be increased or decreased so that an appropriate modification is made when the black fringe signal is summed with the black signal.

In accordance with a second aspect of the present invention, apparatus for enhancing an image represented by picture signals corresponding to respective colour components of successive elements of the image comprises signal generating means for generating sharp and unsharp signals from the picture signals; fringe signal generating means for deriving a plurality of fringe signals by combining the sharp and unsharp signals in a predetermined manner; correction means, connected in parallel with the fringe signal generators, for applying modifying functions to the sharp or unsharp signals or other premodified picture signals to derive modified picture signals; and adding means for summing the fringe signals with the modified picture signals to derive a plurality of output signals.

Conveniently, the various elements of the apparatus may be provided by separate components but where the picture signals comprise digital data then the elements could be provided by a suitably programmed computer in conjunction with suitable look-up tables.

Preferably, the apparatus further comprises black fringe signal generating means for generating a black fringe signal from the one or more fringe signals, wherein the correction means is arranged to generate a black signal from the sharp or unsharp signals or other premodified picture signals, and the adding means is arranged to add the black fringe signal from the black fringe signal generating means to the black signal to derive a black printer signal.

Preferably, the black fringe signal generating means comprises first comparison means for comparing the fringe signals, and means for generating a signal which has a value corresponding to the fringe signal with the least value.

Conveniently, the black fringe signal generating means further includes second comparison means for comparing the black signal from the correction means with a threshold, the black fringe signal generating means and the adding means being arranged so that the black fringe signal is only added to the black signal if the black fringe signal exceeds the threshold.

In another arrangement, the apparatus comprises third comparison means for comparing the modified picture signals, and means for generating a signal which has a value corresponding to the fringe signal associated with the modified picture signal having the least value.

Preferably, the apparatus further comprises fourth comparison means for comparing the black signal with the modified picture signal corresponding to the black fringe signal and for producing an appropriate output signal; and gain adjustment means responsive to the output signal from the fourth comparison means to adjust the magnitude of the black fringe signal accordingly.

Another problem which can arise in some circumstances, particularly where undercolour removal (UCR) is one of the modifications applied to the picture signals, is that at least one of the modified picture signals may have a negligible or even zero magnitude. In this case if a fringe signal was then added to this "non-existent" modified picture signal. fringes could appear in otherwise highlight drop-out areas.

To deal with this problem the method may further comprise comparing each modified picture signal with a threshold, and summing the modified picture signal and the fringe signal only if the modified picture signal exceeds the threshold. For example, the threshold may represent zero print density.

The apparatus may further comprise fifth comparison means for comparing each modified picture signal for which a fringe signal has been generated with a threshold, the arrangement being such that the modified picture signal is only summed with a fringe signal if the threshold is exceeded.

It should be understood that for convenience in some examples fringe signals will always be summed with modified picture signals but the magnitude of the fringe signals will be set to zero in cases where summing should not in fact occur.

It should also be understood that in some circumstances it may be convenient to sum fringe signals and modified picture signals relating to different colour components. This arises for instance when a particular channel, usually yellow, is very noisy. It is then preferable to be able to add the cyan or magenta fringe so that the noise in the yellow channel is diminished.

BRIEF DESCRIPTION OF THE DRAWINGS

Some examples of colour scanning apparatus including apparatus for carrying out a method in accordance with the invention will now be described with reference to the accompanying drawings, in which:

FIGS. 4 and 5 are similar to FIGS. 2 and 3 respectively but illustrate a second example; and, FIG. 6 is a block diagram of part of the apparatus shown in FIG. 5.

DETAILED DESCRIPTION OF THE PREFERRED EMBODIMENTS

Figure 1:
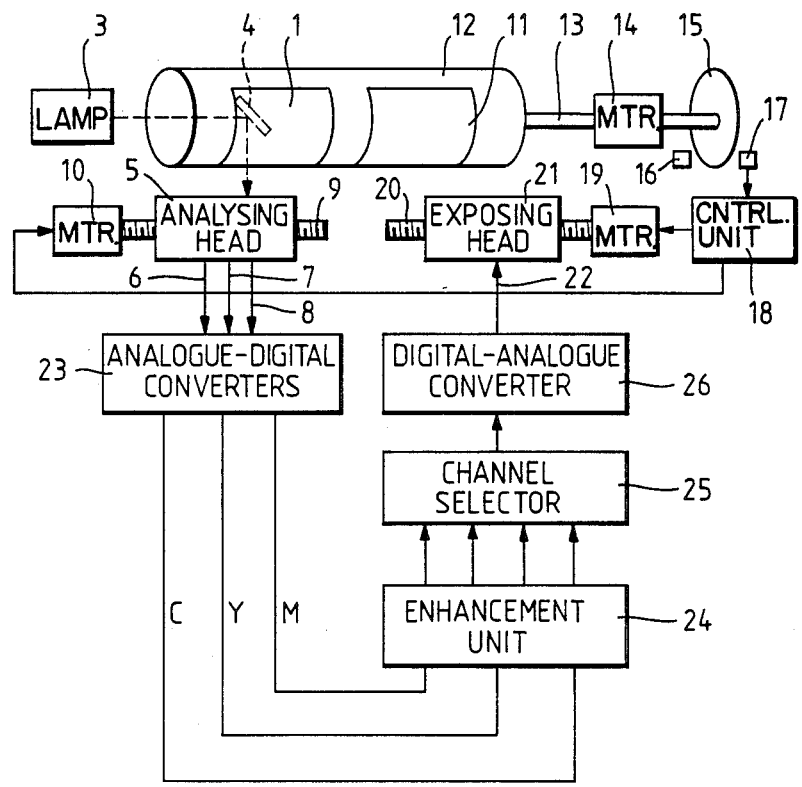
FIG. 1 illustrates diagrammatically the colour scanning apparatus.

In FIG. 1, a transparent original 1 to be reproduced is wrapped around the surface of a transparent drum 12. A xenon lamp 3 directs light rays into the drum and on to a 45° mirror 4, from which the rays pass through the wall of the drum and through the transparent original 1. These light rays reach an analysing head 5 containing colour filter and photoelectric devices such that signals representing the red, blue and green densities of the scanned element of the picture 1 are produced on lines 6, 7, and 8 respectively. Because printing is carried out in subtractive colours, the lines 6, 7 and 8 will be considered to be part of the cyan, yellow and magenta colour channels. The analysing head 5 is mounted on a lead screw 9 which is driven in synchronism with the rotation of the drum 12 by a motor 10. As a consequence, the analysing head sees a point on the drum 12 which, as the drum rotates and the analysing head moves along its lead screw, traces out a helical path along the drum 12 and consequently traces out a number of parallel scanning lines on the original 1.

A light-sensitive sheet 11 to be exposed is mounted on the drum 12. The drum 12 is mounted on a shaft 13 driven by a motor 14. The motor also drives a slotted disc 15, the slotted periphery of which rotates between a light source 16 and a photoelectric cell 17. Pulses derived from the photoelectric cell 17 are applied to a control unit 18 which controls the rotation of the motor 10, driving the lead screw for the analysing head, and a motor 19 which drives a lead screw 20 on which is mounted an exposing head 21. The exposing head 21 includes a light source which traces out a helical pattern on the drum 12 and which is modulated by a signal on a line 22. This signal is derived from the input signals on lines 6, 7 and 8 in the following manner.

The signals on the lines 6, 7, and 8 are first applied to analogue-digital converters 23, the digital outputs of which are fed to an enhancement unit 24. The enhancement unit 24 will be described in more detail below and as will be explained provides four output signals representing the corrected signals for cyan, yellow and magenta, together with a black signal. A channel selector 25 receives the four signals, representing the cyan, yellow, and magenta printer values and the black printer value, and selects the one which corresponds to the separation to be made with the light-sensitive sheet 11. This signal is converted into analogue form in a converter 26 and is then used to modulate the light source in the exposing head 21.

Figure 2:
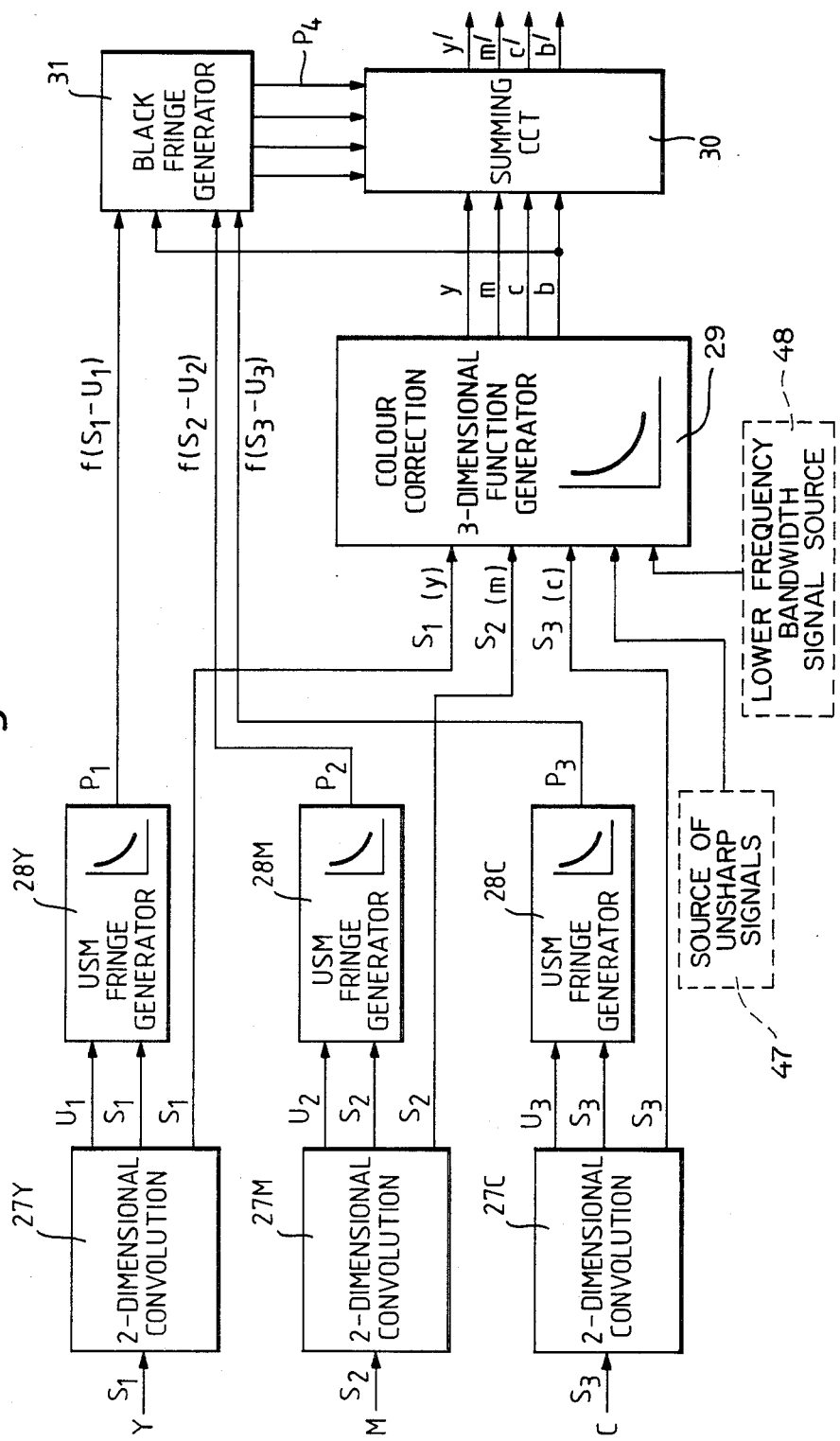
FIG. 2 is a block diagram illustrating the enhancement unit shown in FIG. 1 in more detail.

FIG. 2 illustrates the enhancement unit 24 in more detail. The three signals representing yellow, magenta, and cyan are fed to respective signal generators 27Y, 27M, and 27C. These signal generators carry out a two dimensional convolution process on the incoming signals to generate an unsharp signal (U) and a sharp signal (S). For convenience, a subscript 1 is used to represent yellow, a subscript 2 to represent magenta, and a subscript 3 to represent cyan in in the drawing.

The two dimensional convolution process carried out by the signal generators effectively applies a mask having dimensions of say 5 pixels×5 pixels to successive sets of picture elements, the central pixel being taken to represent the sharp value while the unsharp value is the mean of the 25 pixels. This 5×5 matrix is moved over the entire image during the processing stage.

Each pair of unsharp and sharp signals is fed to a respective fringe generator 28Y, 28M, 28C. Each of these fringe generators applies a predetermined function to the incoming signals to generator respective output fringe signals.

In its simplest form, the unsharp masking algorithm applied by each fringe generator may be defined as follows:

P=K(log 1/U−log 1/S)

where

K controls the amount of unsharp masking which is added, and

U=unsharp transmittance signal,

S=sharp transmittance signal, and

P=output fringe signal.

Modifications to this basic unsharp masking algorithm could be used for example as described in our British Patent Specification No. 2,032,219. In another modification (not shown) instead of applying the sharp signal from each of the signal generators 27Y, 27M, 27C to the respective fringe generators the same sharp signal (for example $S_3$) could be applied to each fringe generator.

A conventional three dimensional colour correction circuit 29 is also provided to which the sharp signals $S_1$, $S_2$, $S_3$ are also fed. This colour correction unit generates a black signal b and makes corresponding adjustments to the other three signals to compensate for the black signal and in addition other corrections such as tone control may be carried out under operator control. Examples of such modifications are illustrated in more detail in our copending British Patent Application No. 2053619. Essentially, the colour correction unit 29 includes a number of look-up tables whose contents are controlled by an operator and which are addressed by the incoming digital signals.

Figure 3:
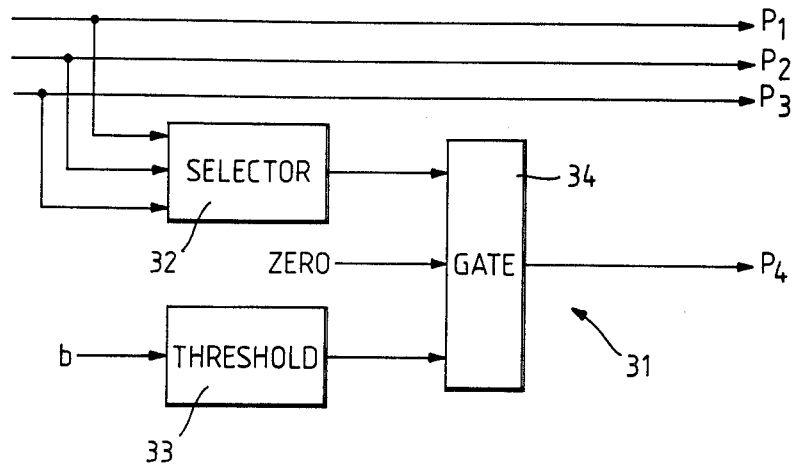
FIG. 3 illustrates the black fringe generator shown in FIG. 2 in more detail.

The three fringe signals $P_1$, $P_2$ and $P_3$ are fed to a black fringe generator 31 (FIG. 3). This generator 31 includes a selector or comparator 32 which compares the values of the three fringe signals and selects the fringe signal with the least value which is outputted from the selector. The black signal b from the correction unit 29 is then compared in a threshold comparator 33 with a threshold representing for example a print density which would correspond to 15% dot size. If the value of the black signal b is greater than the threshold then a gate 34 of the generator 31 is enabled by an output signal from the comparator 33 to pass the output signal from the selector 32 to the summing circuit 30 as a black fringe signal $P_4$ equal to the incoming fringe signal with the least value. The original three fringe signals are passed unmodified through the generator 31 together with the black fringe signal $P_4$ to the summing circuit 30. If the threshold is not exceeded by b, the gate 34 is alternatively enabled to pass a zero input as the signal $P_4$. In this case, effectively no black fringe signal is generated.

The four output signals from the colour correction unit 29 are also fed to the summing circuit 30 where they are linearly summed with the four fringe signals $P_1$–$P_4$ pixel by pixel to generate four output signals which are then fed to the channel selector 25.

In an alternative arrangement the corresponding unsharp signals could be fed to the colour correction unit 29 from signal source 47 instead of the sharp signals. Instead of the sharp or unsharp signals some other signals related to the picture signals could be fed to the colour correction unit 29, for example a signal of lower frequency bandwidth from signal source 49.

Figure 5:
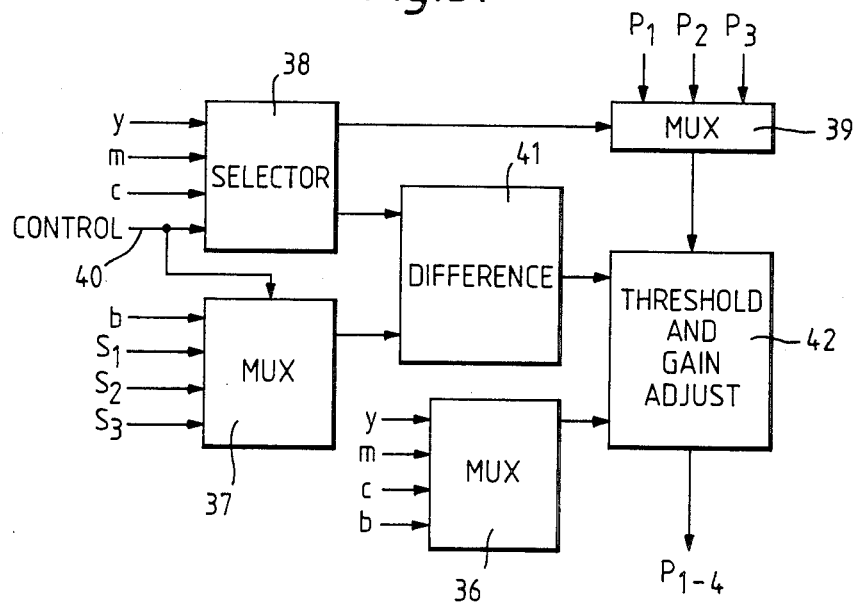

A more complex arrangement is illustrated in FIGS. 4 and 5 which enables not only a black fringe signal to be generated but also increases the versatility of the apparatus by enabling any fringe signal to be added to any modified picture signal as well as enabling modification of the fringe signals to be made. As can be seen in FIG. 4, a fringe signal generator 35 is provided to which are fed the three fringe signals $P_1$–$P_3$, the sharp signals $S_1$–$S_3$, and the modified picture signals, including the black signal, y, m, c, b from the correction unit 29.

The fringe signal generator 35 is shown in more detail in FIG. 5. The modified picture signals from the correction unit 29 are fed to a multiplexer 36. The black signal b is also fed to a multiplexer 37 while the non-black signals y, m, c are fed to a selector 38. The three sharp signals $S_1$–$S_3$ are fed to the multiplexer 37 while the three fringe signals $P_1$–$P_3$ are fed to a multiplexer 39. The selector 38 and the multiplexer 37 are controlled by a control signal applied on a line 40 to operate in either a "black mode" or a "colour mode". These will be described below. The control signal originates from the fundamental clocks of the control system (not shown). The fundamental clocks also control the multiplexer 36. The other components of the fringe signal generator 35 are also controlled by these fundamental clocks but for simplicity connections between the clocks and the components have been omitted.

In the black mode the signal output from the multiplexer 37 is the black signal b generated by the correction unit 29. This is fed to a difference comparator 41. The selector 38 is controlled, in the black mode, to feed a signal to the difference comparator 41 corresponding to the input signal (y,m,c) having the least value (ie. colour density or transmittence). In addition, the selection 38 outputs a signal to the multiplexer 39 indicating which of the three input signals has the least value.

Figure 6:
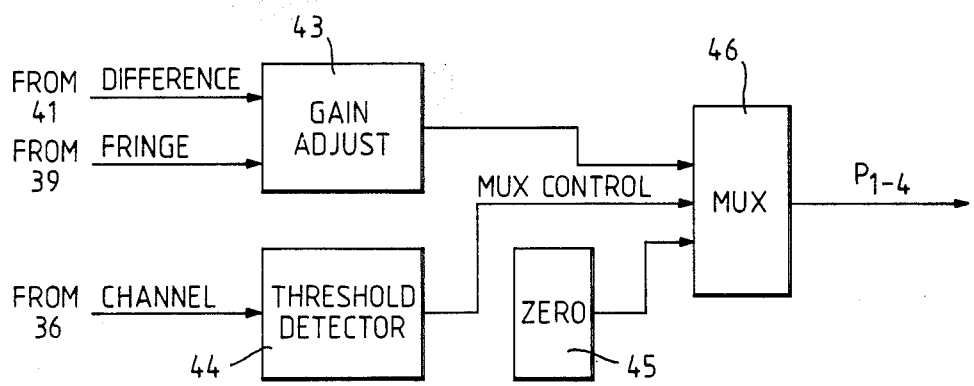

The difference comparator 41 subtracts the signal from the multiplexer 37 from the least value signal from the selector 38. The output from the difference comparator 41 will thus be a signal representing either a positive or negative difference (or zero) and this is passed to a gain adjust and threshold detector circuit 42 (shown in more detail in FIG. 6).

The multiplexer 39 passes the fringe signal $P_1-P_3$ corresponding to the colour selected by the selector 38 to a gain adjust circuit 43 of threshold detector circuit 42. This fringe circuit is then modified in the circuit 43 according to the difference determined by the difference comparator 41 and the function defined by the circuit 43. Thus, for example, the fringe signal would be amplified by increasing the gain for a negative difference or reduced for a positive difference. The amount of amplification can be variable to suit the users requirements. In addition, the black signal from the colour correction unit 29 is fed via the multiplexer 36 to a threshold detector circuit 44 of the circuit 42 where it is compared with a preselected threshold. This threshold may represent for example a print density of 15%. The output signal from the circuit 44 controls a multiplexer 46 to which the output from the circuit 43 and a zero output from a circuit 45 are fed. The threshold detector circuit 44 normally enables the multiplexer 46 to output the signal from the circuit 43 since the threshold will be exceeded. If however the threshold value is not exceeded, then the multiplexer is caused to pass the zero output from circuit 45. The output signal from the circuit 42 then passes to the adder 30 where it is added to the black signal from the colour correction unit 29.

The main advantage of providing the gain adjust facility is to deal with problems which can arise when certain modifications are performed by the correction unit 29. In some cases, these modifications can result in a black signal which is very much greater in magnitude than the one of the other signals having the lowest value and so this apparatus is able to make an appropriate change in the size of the black fringe signal.

To cause the selector 38 and multiplexer 37 to act in the colour mode, the control signal on the line 40 is adjusted accordingly to cause the selector 38 to pass to the difference comparator 41 each of the three input signals in turn. This should be contrasted with the black mode in which the signal with the least value is passed to the difference comparator 41. In addition, the signal fed to the multiplexer 39 by the selector 38 causes an appropriate one of the three fringe signals to be selected by the multiplexer 39. This need not necessarily be the fringe signal which corresponds to the selected colour component signal to enable any fringe signal to be added to any colour component signal. The multiplexer 37 is caused to feed the appropriate sharp signal corresponding to the selected fringe signal to the difference comparator 41.

The output from the comparator 41 is used, as in the black mode, to control the gain adjust circuit 43 of the circuit 42 to modify the selected fringe signal from the multiplexer 39. In this mode, however, the main advantage is achieved by feeding the appropriate modified picture signal via the multiplexer 36 to the threshold detector circuit 44 where it is compared with a threshold. This enables the fringe signal output by the multiplexer 46 to be suppressed (ie set to zero) if the selected modified picture signal is less than the threshold and in particular zero.

The output from the circuit 42 comprises a multiplexed set of fringe signals which are fed to the summing circuit 30. This will be slightly different from the circuit 30 shown in FIG. 2 since it will require an additional multiplexer at its input to multiplex the four incoming modified picture signals.

It will be appreciated that the unsharp masking algorithm described above is non-linear and the algorithms applied to the three sharp signals by the colour correction unit 29 also are commonly non-linear. Since the unsharp masking process is carried out in parallel with the other colour correction modifications, the application of two non-linear algorithms in series is avoided.

It should also be appreciated that the apparatus is controlled by a computer which has been omitted for clarity.

Although the invention has been described in connection with the processing of digital data, the invention is also applicable to the processing of analogue signals.

We claim:

1. A method of enhancing an image represented by picture signals (Y,M,C) corresponding to respective colour components of successive elements of said image, the method comprising the steps of:
   (a) deriving sharp (S) and an unsharp (U) signals from said picture signals;
   (b) deriving a plurality of fringe signals (P) by combining said sharp and unsharp signals in a predetermined manner;
   (c) in parallel with step (b), applying modifying functions to signals chosen from a group comprising said sharp signals, said unsharp signals and signals of a lower frequency bandwidth, to derive modified picture signals (y,m,c); and
   (d) summing said fringe signals with said modified picture signals to derive a plurality of output signals (y',m',c').

2. A method according to claim 1, further comprising deriving a black signal (b) from said picture signals; deriving a black fringe signal (p4); and summing said black fringe signal with said black signal to derive a black printer signal (b').

3. A method according to claim 2, wherein said black fringe signal is only summed with said black signal if said black signal has a value above a predetermined threshold.

4. A method according to claim 2, wherein said step of deriving a black fringe signal comprises comparing said fringe signals to determine the fringe signal with the smallest value, said determined fringe signal being used additionally to constitute said black fringe signal.

5. A method according to claim 2, wherein said step of deriving a black fringe signal comprises comparing said modified picture signals corresponding to each fringe signal ($P_1$–$P_3$) to determine said modified picture signal with the smallest value, the fringe signal corresponding to said modified picture signal having the smallest value being used additionally to constitute said black fringe signal.

6. A method according to claim 2, wherein the modified picture signal whose fringe signal corresponds to said black fringe signal is compared with said black signal, said black fringe signal being modified in accordance with the results of said comparison.

7. A method according to claim 1, further comprising comparing each modified picture signal with a threshold, and summing said modified picture signal and said fringe signal only if said modified picture signal exceeds said threshold.

8. Apparatus for enhancing an image represented by picture signals (Y,M,c) corresponding to respective colour components of successive elements of said image, the apparatus comprising:
(a) signal generating means (27) for generating sharp and unsharp signals from said picture signals;
(b) fringe signal generating means (28) for deriving a plurality of fringe signals by combining said sharp and unsharp signals in a predetermined manner;
(c) correction means (29) connected in parallel with the fringe signal generating means for applying modifying functions to signals chosen from a group comprising said sharp signals, said unsharp signals and signals of a lower frequency bandwidth, to derive modified picture signals (y,m,C); and
(d) adding means (3) for summing said fringe signals with said modified picture signals to derive a plurality of output signals (y',m',c').

9. Apparatus according to claim 8, further comprising black fringe signal generating means (31) for generating a black fringe signal (P4) from said at least one fringe signal, said correction means being adapted to generate a black signal (b) from said chosen signals, and said adding means being adapted to add said black fringe signal from said black fringe signal generating means to said black signal to derive a black printer signal (b').

10. Apparatus according to claim 9, wherein said black fringe signal generating means comprises first comparison means (32) for comparing said fringe signals, and means (34) for generating a signal which has a value corresponding to the fringe signal with the least value.

11. Apparatus according to claim 9 wherein said black fringe signal generating means further includes second comparison means (33) for comparing said black signal from said correction means with a threshold, said black fringe signal generating means and said adding means being adapted to add said black fringe signal to said black signal only if said black fringe signal exceeds said threshold.

12. Apparatus according to claim 9, further comprising fourth comparison means for comparing said black signal with the modified picture signal corresponding to said black fringe signal and for producing an appropriate output signal; and gain adjustment means responsive to said output signal from said fourth comparison means to adjust the magnitude of said black fringe signal accordingly.

13. Apparatus according to claim 8, the apparatus further comprising third comparison means for compariing said modified picture signals, and means for generating a signal which has a value corresponding to the fringe signal associated with the modified picture signal having the least value.

* * * * *